US000001319H

United States Statutory Invention Registration [19]

[11] Reg. Number: H1319

Stroup

[43] Published: Jun. 7, 1994

[54] CURRENT LIMIT CIRCUIT FOR POWER SUPPLY REGULATORS

[76] Inventor: Thomas C. Stroup, 11300 Helena Trails SW., Port Orchard, Wash. 98366

[21] Appl. No.: 671,594

[22] Filed: Mar. 19, 1991

[51] Int. Cl.[5] ..... G05F 1/575

[52] U.S. Cl. ..... 323/282; 323/277; 361/79

[58] Field of Search ..... 323/276, 277, 278, 280, 323/908; G05F 1/46, 1/56, 1/569, 1/573

[56] References Cited

U.S. PATENT DOCUMENTS

| | | | |
|---|---|---|---|
| 3,078,410 | 2/1963 | Thomas | 323/278 |
| 3,101,441 | 8/1963 | Curry . | |
| 3,173,078 | 3/1965 | Farnsworth . | |
| 3,201,680 | 8/1965 | Ross et al. . | |
| 3,219,912 | 11/1965 | Harrison . | |
| 3,234,453 | 2/1966 | Klees et al. . | |
| 3,671,852 | 6/1972 | Ritzenthaler | 323/278 |
| 3,959,713 | 5/1976 | Davis et al. . | |
| 4,180,768 | 12/1979 | Ferraro | 323/278 |
| 4,335,345 | 6/1982 | Converse | 323/278 |

*Primary Examiner*—Bernarr E. Gregory

[57] ABSTRACT

Most power supply regulators either cause the output voltage to drop-off gradually, or caused output oscillation upon reaching or exceeding the limit current. Current limit feedback to an error amplifier within a switching regulator is used to control the output voltage, prevent oscillation, insure that current limiting does not occur until a well-defined threshold is achieved and then steeply limit the current. The circuit uses feedback to the switching regulator to maintain the output voltage within desired limits. The output current flows through the current limit resistor $R_c$ thus providing a voltage proportional to the current at the base-emitter junction of $Q_1$ via $CR_1$ and $R_2$. During normal operation, the forward biased $CR_1$ voltage maintains a reverse bias on the B-E junction of $Q_1$. When the voltage across $R_c$ exceeds the forward bias on $CR_1$, $Q_1$ turns on, hence turning on $Q_2$, thus providing its contribution to the current limit feedback circuitry for use by the switching regulator.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CURRENT LIMIT CIRCUIT FOR POWER SUPPLY REGULATORS

FIELD OF THE INVENTION

This invention pertains to a method and apparatus for limiting current in a power supply.

BACKGROUND OF THE INVENTION

Most prior art circuits either caused the output voltage to drop-off gradually, or caused output oscillation upon reaching or exceeding the limit current.

OBJECTIVES OF THE INVENTION

It is therefore a primary objective of the present invention to provide a circuit for regulating voltage of a power supply to provide good regulation of voltage up to a desired current limit value.

It is another objective to drop the voltage sharply above the desired current limit.

Still another objective is to avoid oscillation of the output voltage.

A further objective is provide a highly reliable circuit.

SUMMARY OF THE INVENTION

Current limit feedback to an error amplifier within a switching regulator is used to control the output current, prevent oscillation, insure that current limiting does not occur until a well-defined threshold is achieved and then steeply limit the current.

These objects of the invention and other objects, features and advantages to become apparent as the specification progresses are accomplished by the invention according to which, briefly stated, current limit feedback to an error amplifier within a switching regulator is used to control the output voltage and prevent oscillation.

LIST OF ADVANTAGES OF THE INVENTION

An important advantage of the present invention is that the circuit uses provides a square voltage-current curve.

Another advantage is that the circuit uses few components.

A further advantage is that most components of the circuit are fairly insensitive to component tolerances or parameters.

Still another advantage is that oscillation is prevented.

These and further objectives, constructional and operational characteristics, and advantages of the invention will no double be more evident to those skilled in the art from the detailed description given hereinafter with reference to the figures of the accompanying drawings which illustrate a preferred embodiment by way of non-limiting example.

GLOSSARY

Figure 1:
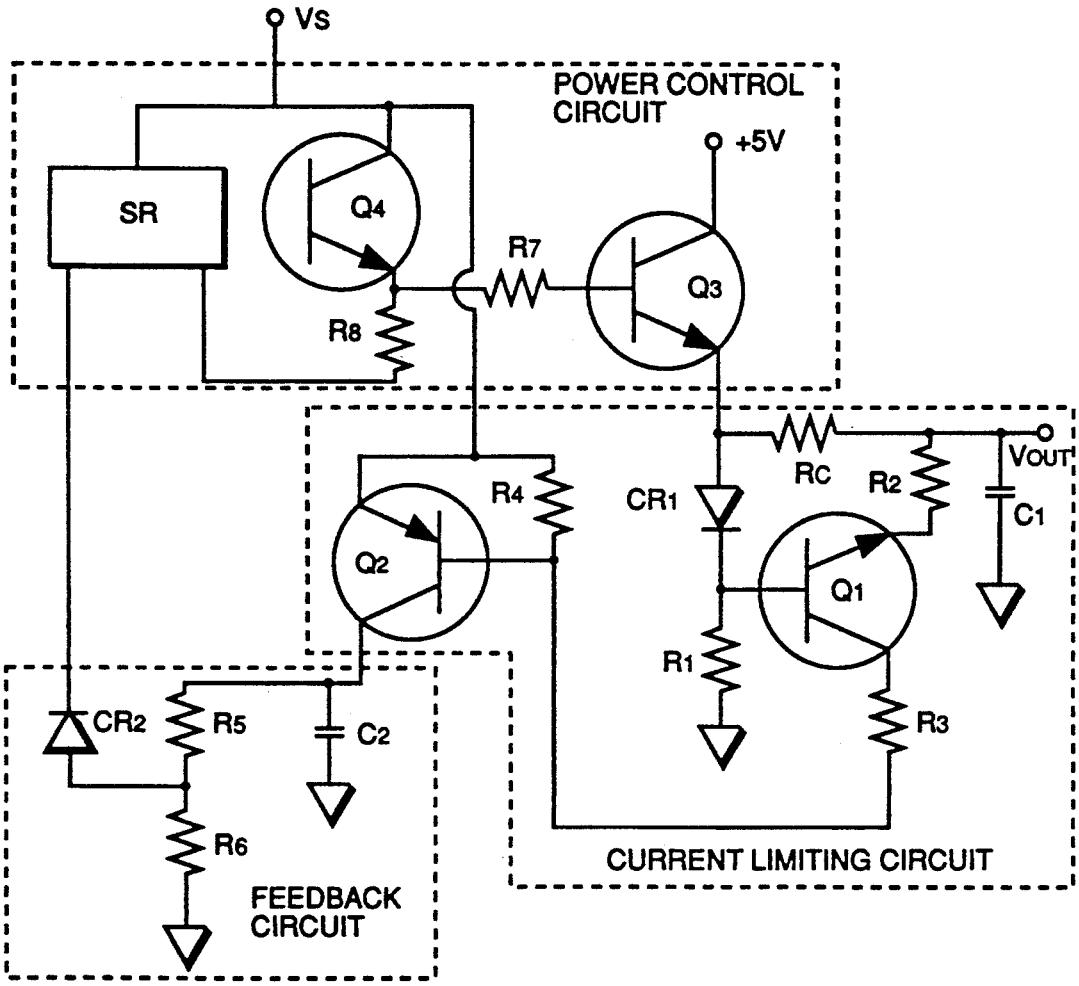
FIG. 1 shows the circuit according to the invention.

The following is a glossary of circuit elements as referenced and employed in the present invention.

$Q_1$—2N2222A transistor
$Q_2$—2N2907A transistor
$Q_3$—2N3584 transistor
$Q_4$—2N3584 transistor
CR1,CR2—1N414B diodes
$R_c$—0.249Ω resistor
$R_1$—1000Ω resistor
$R_2$—16.2Ω resistor
$R_3$—4.99Ω resistor
$R_4$—499Ω resistor
$R_5$—3.01kΩ resistor
$R_6$—499Ω resistor
$R_7$—90.9Ω resistor
$R_8$—10kΩ resistor
$C_1$, $C_2$—0.01 mfd capacitors
SR—switching regulator IC, e.g. Harris FG1532

DESCRIPTION OF THE PREFERRED EMBODIMENTS

Referring now to the drawings wherein like reference numerals are used to designate like or corresponding parts throughout the various figures thereof, there is shown in FIG. I the circuit according to the invention.

The invention uses feedback to the switching regulator to maintain the output voltage $V_{out}$ within desired limits. The output current flows through the current limit resistor $R_c$ thus providing a voltage proportional to the current at the base-emitter junction of $Q_1$ via $CR_1$and $R_2$. During normal operation, the forward biased $CR_1$ voltage maintains a reverse bias on the B-E junction of $Q_1$. When the voltage across $R_c$ exceeds the forward bias on $CR_1$, $Q_1$ turns on, hence turning on $Q_2$, thus providing its contribution to the current limit feedback circuitry for use by the switching regulator SR.

$R_1$ is a resistor that maintains the continuous forward bias current through $CR_1$. $R_2$ provides some current limiting for the base-emitter junction of $Q_1$ during hard current limiting conditions and output current spikes. $R_3$ prevents $Q_2$ from being driven too hard by $Q_1$. $R_4$ provides a path for leakage current from the base-collector junction of $Q_2$ thus helping to hold it off during normal operation. Capacitor $C_1$ is simply a filter capacitor for the regulator output.

Within the feedback circuit, $R_5$ and $R_6$ scale the feedback signal to the power control circuit. $C_2$ and CR2 are filters to reduce the noise to the power control circuit.

This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. A circuit for regulating voltage in a power supply, comprising:

a power control circuit means for controlling a voltage of a power source, a current limiting means for generating a feedback signal to said power control circuit means while limiting current to an output, and a feedback circuit means for scaling a signal from a signal generation means to be sent to said power control circuit means.

* * * * *